(12) United States Patent
Leighton et al.

(10) Patent No.: US 6,813,110 B2
(45) Date of Patent: Nov. 2, 2004

(54) DISK DRIVE WRITER WITH CAPACITIVE BOOST

(75) Inventors: John D. Leighton, Anoka, MN (US); Scott M. O'Brien, Eagan, MN (US); Robert J. Wimmer, Hastings, MN (US); Nameeta Krenz, Carver, MN (US); Carl F. Elliott, Eden Prairie, MN (US); Michael J. O'Brien, St. Paul, MN (US); Cameron C. Rabe, Inver Grove Heights, MN (US)

(73) Assignee: Agere Systems Inc., Allentown, PA (US)

( * ) Notice: Subject to any disclaimer, the term of this patent is extended or adjusted under 35 U.S.C. 154(b) by 274 days.

(21) Appl. No.: 10/219,948

(22) Filed: Aug. 15, 2002

(65) Prior Publication Data

US 2004/0032684 A1 Feb. 19, 2004

(51) Int. Cl.[7] .................................................. G11B 5/02
(52) U.S. Cl. .............................. 360/68; 360/46; 327/110
(58) Field of Search ....................... 360/68, 46; 327/110

(56) References Cited

U.S. PATENT DOCUMENTS 5,880,626 A * 3/1999 Dean .......................... 327/110
6,236,247 B1 * 5/2001 Ngo ............................ 327/110
6,271,978 B1 * 8/2001 Block et al. .................. 360/46
6,366,421 B2 * 4/2002 Teterud ........................ 360/68
6,545,514 B2 * 4/2003 Barrow ........................ 327/110

* cited by examiner

Primary Examiner—David Hudspeth
Assistant Examiner—Natalia Figueroa
(74) Attorney, Agent, or Firm—Kinney & Lange, P.A.

(57) ABSTRACT

A write driver circuit selectively provides write current through a write head in first and second opposite directions. First and second active devices are driven with first and second pre-drive signals. Third and fourth active devices are driven with third and fourth pre-drive signals. First and second pull-up resistances are provided respectively between the first and second active devices and a fixed voltage, and third and fourth pull-up resistances are provided respectively between the third and fourth active devices and the fixed voltage. A first capacitor is connected between the first active device and an intermediate point of the third pull-up resistance, and a second capacitor is connected between the second active device and an intermediate point of the fourth pull-up resistance.

9 Claims, 7 Drawing Sheets

DISK DRIVE WRITER WITH CAPACITIVE BOOST

BACKGROUND OF THE INVENTION

The present invention relates to a driving circuit for the write head of a magnetic disk drive, and more particularly to a write driver employing capacitive boost to improve the switching performance of the circuit.

Write driver circuits are employed to provide a write current through a write head in order to record information on a magnetic disk. The write driver circuit is operable to switch the direction of the write current in a pattern that represents data to be recorded, with the switching typically performed by a circuit configuration known in the art as an H-bridge. An H-bridge is characterized by four transistor switches or variations thereof, each forming a leg of the H, with the write head coil being connected to terminals across the center span of the H. Current is directed in a first direction through the write head by operating two semiconductor switches in opposite legs of the H-bridge, and current is directed in the opposite direction through the write head by operating the other two semiconductor switches.

It is desirable for the H-bridge to switch the direction of the write current through the write head as quickly as possible, to enable a high data recording rate. The semiconductor switches of the H-bridge therefore need to be turned on as quickly as possible when they are to conduct current. One way to turn the semiconductor switches on quickly is to provide "overshoot" in the pre-drive signal that drives the transistor switches. Overshoot is defined as the amount by which the pre-drive signal exceeds its quiescent value, when a transition in write current direction is to occur. By overshooting the quiescent value when a transition is commanded, the transistor switches are turned on more quickly, decreasing the time required to switch the write current direction and increasing the rate at which data can be written. This overshoot in the pre-drive signal also causes the write current signal itself to exhibit some amount of overshoot, so that the pre-drive signal waveform and the write current waveform have similar shapes.

There are several factors which can limit the ability of the write driver circuit to provide effective overshoot of the predriver signal. One of these factors is the limit on the pulled-up base voltage of the upper switches of the H-bridge. The bases of these switches (configured as emitter-follower transistors) are conventionally pulled up to the positive voltage supply by a resistor. When the emitter-follower is pulled up maximally, the collector-base junction is unbiased. There is potential to forward-bias this junction by as much as a diode (i.e., about 0.7 volts), since the base of the emitter-follower transistor can be boosted above the supply voltage by as much as a diode before the emitter-follower transistor saturates. It would therefore be desirable to provide a circuit that allows the base voltage of the switching transistor to be boosted to a higher value than is possible with conventional designs. Such a circuit, employing a capacitive boosting technique, is the subject of the present invention.

BRIEF SUMMARY OF THE INVENTION

The present invention is a write driver circuit that selectively provides write current through a write head in first and second opposite directions. First and second active devices are driven with first and second pre-drive signals. Third and fourth active devices are driven with third and fourth pre-drive signals. First and second pull-up resistances are provided respectively between the first and second active devices and a fixed voltage, and third and fourth pull-up resistances are provided respectively between the third and fourth active devices and the fixed voltage. A first capacitor is connected between the first active device and an intermediate point of the third pull-up resistance, and a second capacitor is connected between the second active device and an intermediate point of the fourth pull-up resistance. As a result of the configuration of the present invention, the high frequency response of the circuit is improved. In addition, by controlling the relative amplitudes of the high and low frequency portions of the pre-drive signals, the voltage driving the third and fourth active devices can be boosted toward (and potentially above) the positive supply voltage, improving the switching speed of those devices and increasing the overshoot (and reducing the rise time) of the write current waveform.

DETAILED DESCRIPTION

Figure 1:
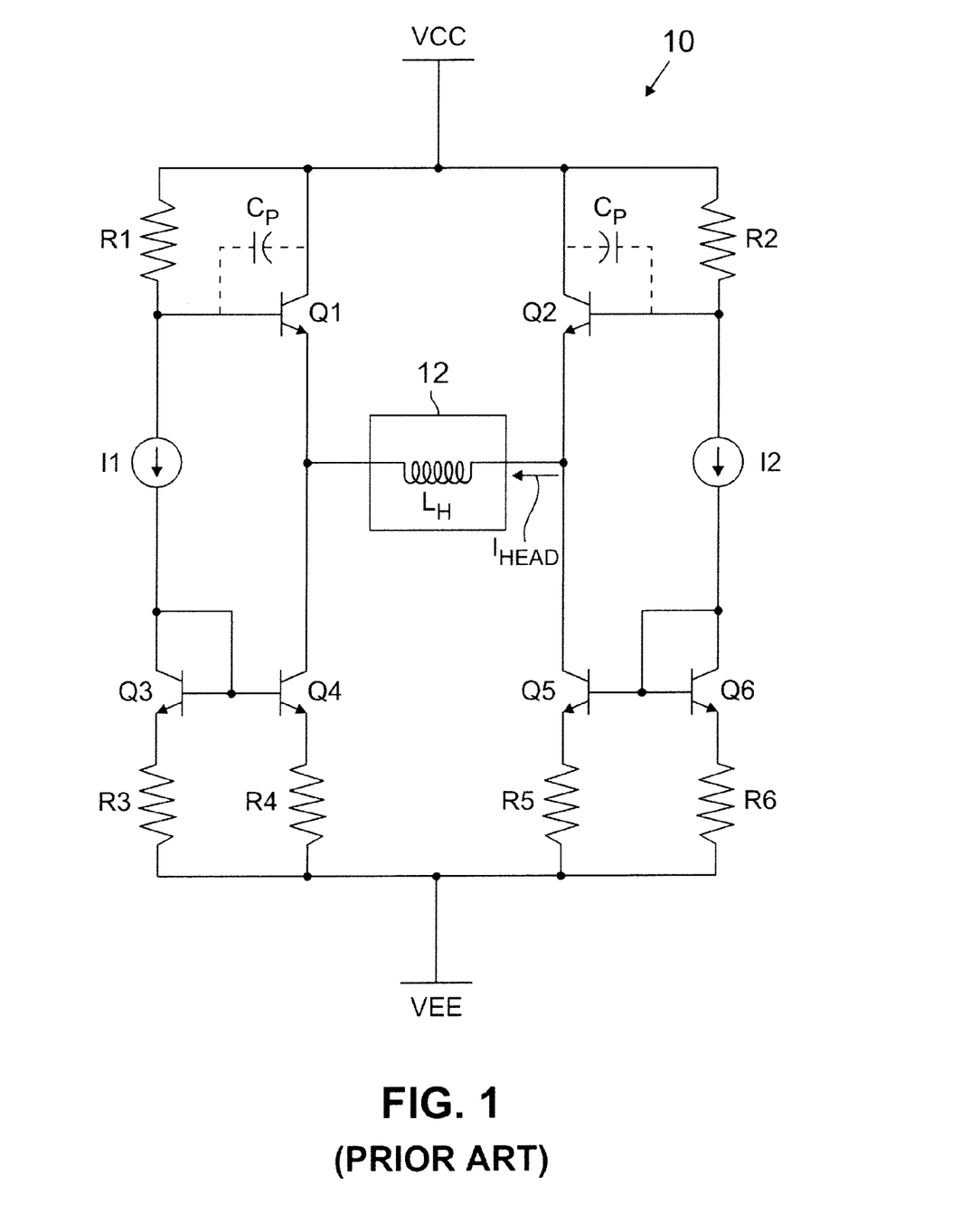
FIG. 1 is a schematic diagram of a prior art write circuit.

FIG. 1 is a schematic diagram of prior art write circuit 10. Write circuit 10 includes resistors R1, R2, R3, R4, R5 and R6, transistors Q1, Q2, Q3, Q4, Q5 and Q6, current sources I1 and I2, and inductive head 12 having inductance $L_H$. Transistors Q1 and Q2 make up the upper switching portion of the circuit, while transistors Q3–Q4 and Q5–Q6 are configured as current mirrors to form the lower portion of the circuit. Transistors Q1 and Q2 each have a parasitic capacitance $C_P$ which is represented schematically in FIG. 1.

Figure 2A:
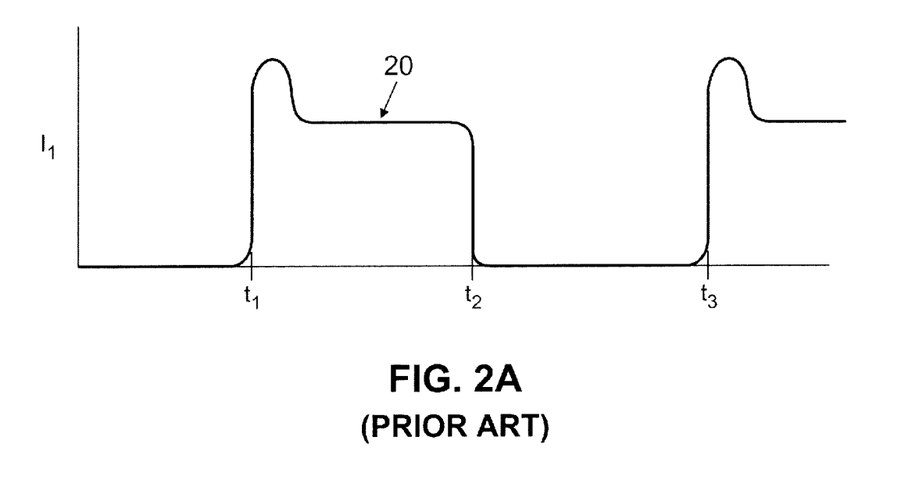
FIGS. 2A–2C are graphs of waveforms which occur in operation of the circuit of FIG. 1.
Figure 2B:
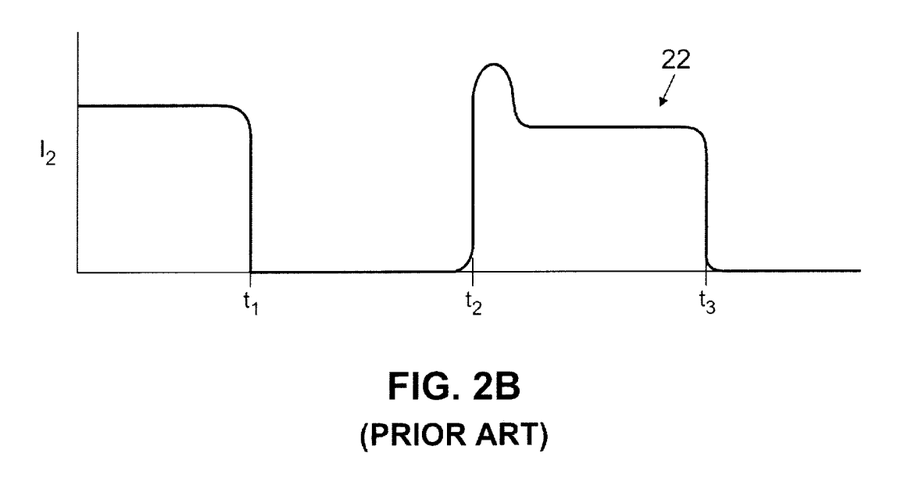
Figure 2C:
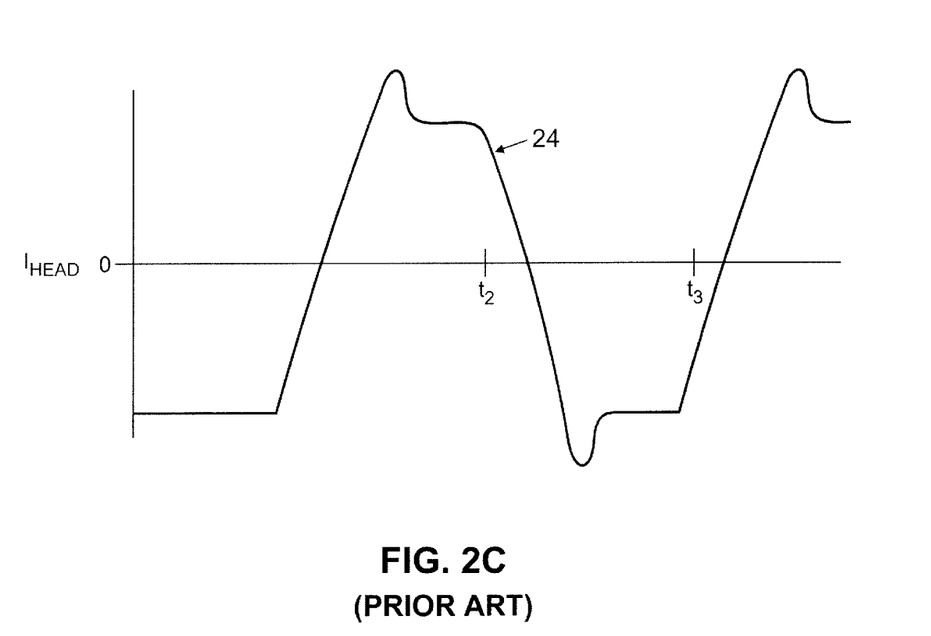

FIGS. 2A–2C are graphs of waveforms which occur in operation of the circuit of FIG. 1. Current sources I1 and I2 provide current in an alternating fashion, as shown by waveforms 20 (FIG. 2A) and 22 (FIG. 2B), respectively. These currents result in a current flowing through one of transistors Q1 and Q2 and through head 12 (FIG. 1). Because of the parasitic capacitances of transistors Q1 and Q2 and their effect on frequency response, the current $I_{HEAD}$ flowing through head 12 (shown by waveform 24, FIG. 2C) takes time to transition between steady state values in opposite directions, known as the "rise time." The frequency response of the emitter follower is governed by the following equation, which determines the effective pole of the frequency response:

$$f = \frac{1}{2\pi RC_P} \qquad \text{(Eq. 1)}$$

where R is the value of the resistor connected to the base of the switching transistor and $C_P$ is the parasitic capacitance of the transistor. For transistor Q1, the relevant resistor is R1, and for transistor Q2, the relevant resistor is R2. In most exemplary embodiments, resistors R1 and R2 are selected to have equal resistances and transistors Q1 and Q2 are selected to have equal parasitic capacitances, to preserve the symmetry of the circuit.

In order to improve the frequency response of the emitter follower (that is, increase the frequency of the effective pole), either the resistance or parasitic capacitance must be reduced. It is not practical to reduce the parasitic capacitance, since the current-carrying capability of the transistor would be compromised. A reduction in the resistance is therefore desirable.

Figure 3:
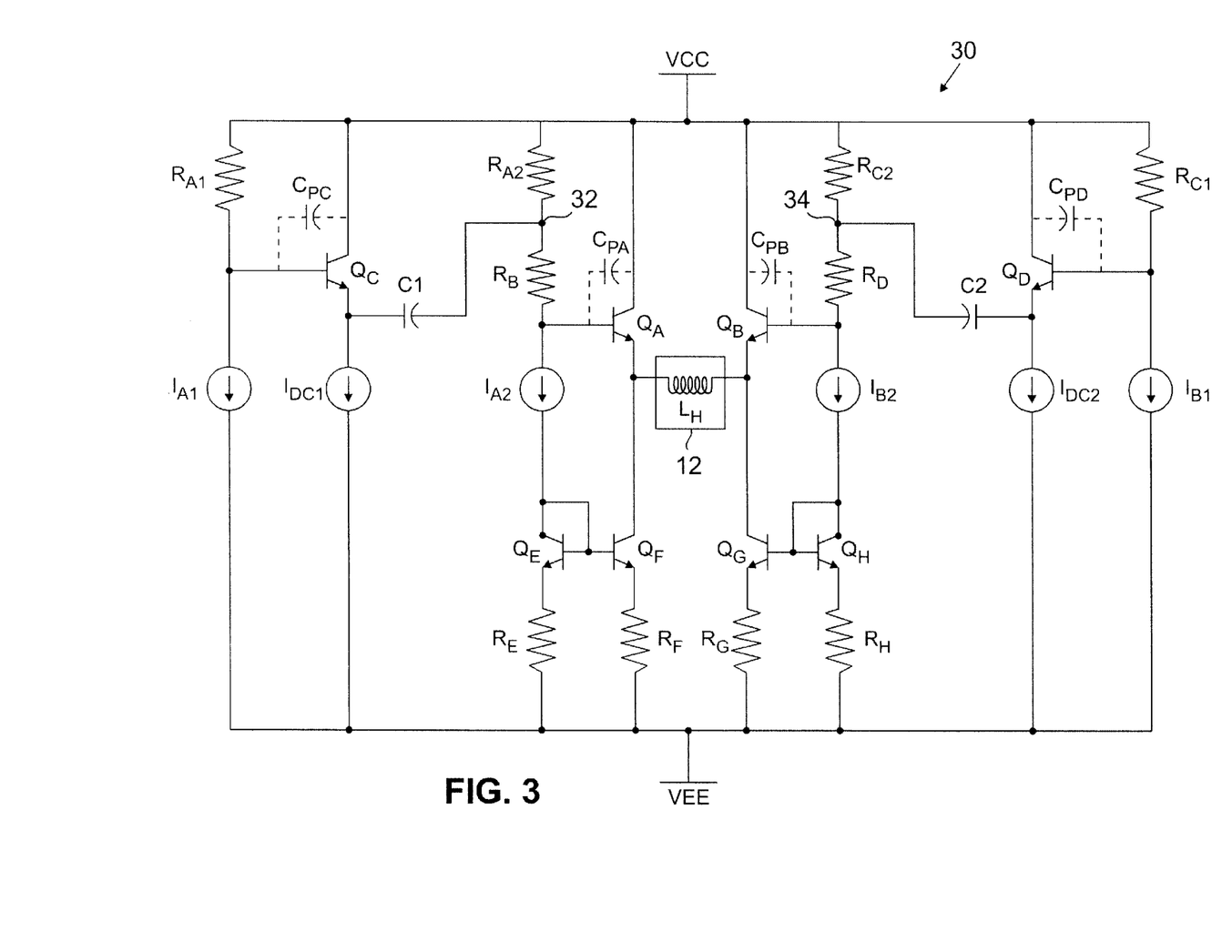
FIG. 3 is a schematic diagram of a write circuit employing capacitive boost according to the present invention.

FIG. 3 is a schematic diagram of write circuit 30 employing capacitive boost according to the present invention. Write circuit 30 includes resistors $R_{A1}$, $R_{A2}$, $R_B$, $R_{C1}$, $R_{C2}$, $R_D$, $R_E$, $R_F$, $R_G$ and $R_H$, transistors $Q_A$, $Q_B$, $Q_C$, $Q_D$, $Q_E$, $Q_F$, $Q_G$ and $Q_H$, capacitors C1 and C2, current sources $I_{A1}$, $I_{A2}$, $I_{B1}$, $I_{B2}$, $I_{DC1}$ and $I_{DC2}$, and head 12 having an inductance $L_H$. Transistors $Q_A$, $Q_B$, $Q_C$ and $Q_D$ make up the upper switching portion of the circuit, while transistors $Q_E$–$Q_F$ and $Q_G$–$Q_H$ are configured as current mirrors to form the lower portion of the circuit to pull current through the write head. Transistors $Q_A$, $Q_B$, $Q_C$ and $Q_D$ have respective parasitic capacitances $C_{PA}$, $C_{PB}$, $C_{PC}$ and $C_{PD}$ which are represented schematically in FIG. 3.

Figure 4A:
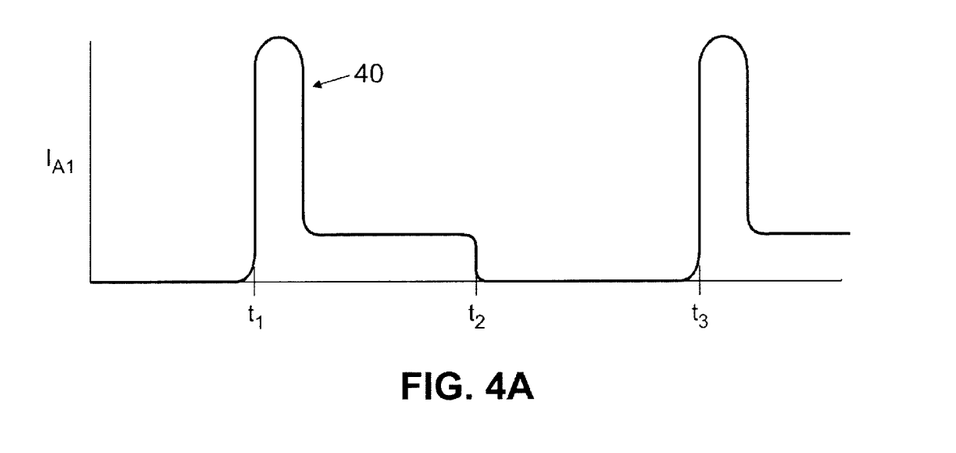
FIGS. 4A–4E are graphs of waveforms which occur in the operation of the circuit of FIG. 3.
Figure 4B:
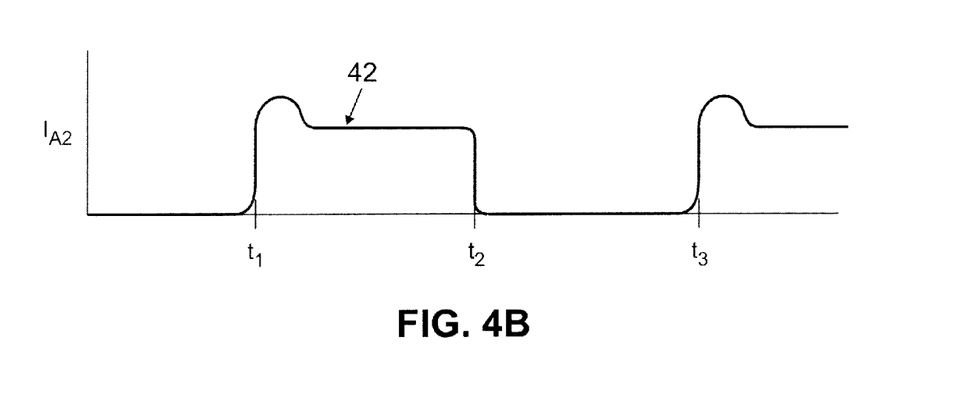
Figure 4C:
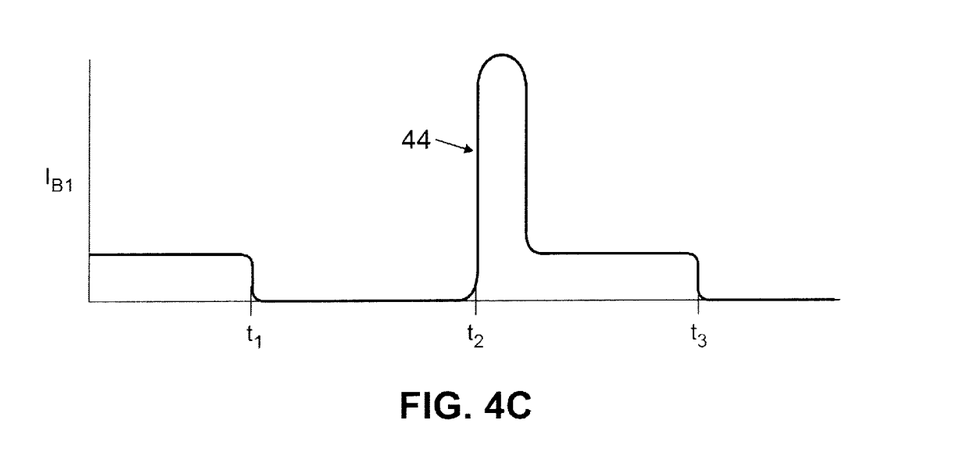
Figure 4D:
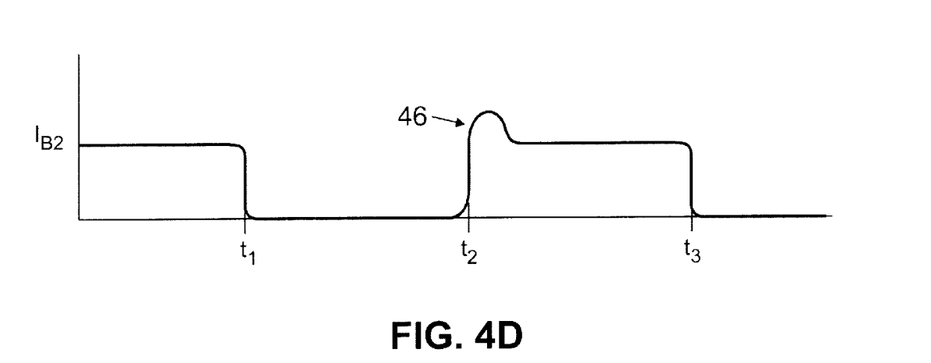
Figure 4E:
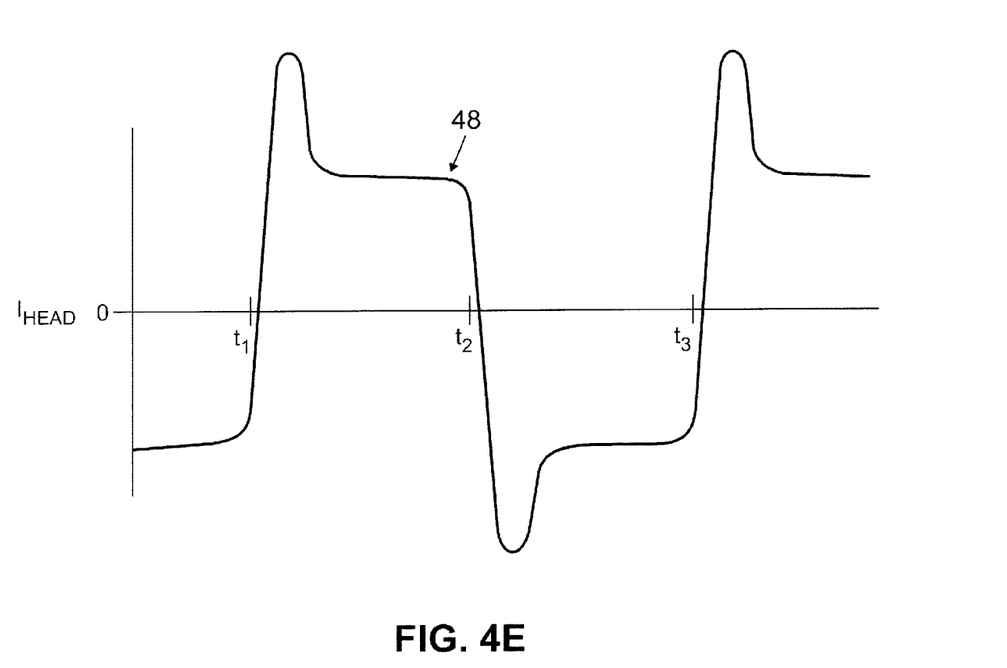

FIGS. 4A–4E are graphs of waveforms which occur in operation of the circuit of FIG. 3. Current sources $I_{A1}$, $I_{A2}$, $I_{B1}$ and $I_{B2}$ are configured to provide pre-drive currents. Current sources $I_{A1/A2}$ and $I_{B1/B2}$ provide current in an alternating fashion, as shown by waveforms 40 (FIG. 4A), 42 (FIG. 4B), 44 (FIG. 4C) and 46 (FIG. 4D), respectively. The write current $I_{HEAD}$ flowing through the write head is shown as waveform 48 (FIG. 4E).

Referring again to FIG. 3, transistors $Q_C$ and $Q_D$ are configured as emitter-followers. Resistors $R_{A1}$ and $R_{C1}$ are selected to have a value of about 75% of the value of a conventional pull-up resistor (such as R1 shown in FIG. 1). Transistors $Q_C$ and $Q_D$ therefore have good high frequency response, since the resistance is reduced (see Eq. 1). Current sources $I_{DC1}$ and $I_{DC2}$ provide a DC current to ensure that transistors $Q_C$ and $Q_D$ are always on. As a result, the signals at the emitters of transistors $Q_C$ and $Q_D$ accurately reflect the signal content of the input signals provided by current sources $I_{A1}$ and $I_{B1}$.

Series capacitors C1 and C2 pass the high frequency content of the signals at the emitters of transistors $Q_C$ and $Q_D$ on to node 32 between resistors $R_{A2}$ and $R_B$ (an intermediate point of the pull-up resistance) and to node 34 between resistors $R_{C2}$ and $R_D$ (an intermediate point of the pull-up resistance), respectively. Resistors $R_{A2}$ and $R_{C2}$ are selected to have values equal to the values of resistors $R_{A1}$ and $R_{A2}$ (about 75% of the value of a conventional pull-up resistor), and resistors $R_B$ and $R_D$ are elected to have a value of about 25% of the value of a conventional pull-up resistor. Since resistors $R_{A2}$ and $R_B$ are connected in series between the base of transistor $Q_A$ and $V_{CC}$, and resistors $R_{C2}$ and $R_D$ are connected in series between the base of transistor $Q_B$ and $V_{CC}$, the total pull-up resistance provided for transistors $Q_A$ and $Q_B$ is equal to the conventional pull-up resistance. However, the resistance that affects the frequency response of transistors $Q_A$ and $Q_B$ is only $R_B$ and $R_D$, respectively. Since $R_B$ and $R_D$ are only about 25% of the value of a conventional pull-up resistor, the effective pole of the frequency response of transistors $Q_A$ and $Q_B$ is about four times higher than in a conventional system.

The preceding description has explained the improved frequency response of the circuit of FIG. 3. Capacitive boost of the voltage across head 12 may also be obtained by adjusting the signal waveforms provided by current sources $I_{A1}$, $I_{A2}$, $I_{B1}$ and $I_{B2}$. Specifically, as shown in FIGS. 4A–4D, the target write waveform is essentially decomposed into a boost (higher frequency) portion provided by current sources $I_{A1}$ and $I_{B1}$, and a steady state (lower frequency) portion provided by current sources $I_{A2}$ and $I_{B2}$. A greater percentage of the overshoot portion of the signal is assigned to the boost current source ($I_{A1}$ and $I_{B1}$), compared to the portion assigned to the steady state current source ($I_{A2}$ and $I_{B2}$). This is shown graphically in the disparate magnitudes of the overshoot portions and steady state portions of the waveforms shown in FIG. 4A–4D. As a result, the voltage at the bases of transistors $Q_A$ and $Q_B$ is level shifted toward (and potentially above) the positive supply voltage $V_{CC}$. The total amount of level shifting that is possible is limited by the difference between the overshoot voltage of the write voltage waveform and the steady state voltage of the write voltage waveform, which is supply limited. The amount of level shifting is limited to about a diode (i.e., about 0.7 volts), at which point the emitter follower transistor would saturate. The circuit of the present invention improves the switching speed and frequency response of the system, as shown by the increased overshoot and faster switching of write current direction in waveform 48 of FIG. 4E (compared to waveform 24 of FIG. 2C).

For the benefit of those skilled in the art, a mathematical explanation of the frequency response benefits of the present invention is also included. The frequency response associated with transistor $Q_C$ driven by current source $I_{A1}$, is as follows:

$$V_{A1} = I_{A1} R_{A1} \frac{j\omega C_1 R_{A2}}{1 + j\omega[C_1 R_{A2} + C_{PA}(R_{A2} + R_B)] - \omega^2 C_1 R_{A2} C_{PA} R_B} \quad \text{(Eq. 2)}$$

The frequency response associated with transistor $Q_A$, driven by current source $I_{A2}$, is as follows:

$$V_{A2} = I_{A2}(R_{A2} + R_B) \quad \text{(Eq. 3)}$$

$$\frac{1 + j\omega C_1 (R_{A2} \| R_B)}{1 + j\omega[C_1 R_{A2} + C_{PA}(R_{A2} + R_B)] - \omega^2 C_1 R_{A2} C_{PA} R_B}$$

By selecting the value of C1 to be much greater than $C_{PA}$, the equations can be approximated in a much simpler manner:

$$V_{A1} \approx I_{A1} R_{A1} \frac{j\omega C_1 R_{A2}}{(1 + j\omega C_1 R_{A2})(1 + j\omega C_{PA} R_B)} \quad \text{(Eq. 4)}$$

$$V_{A2} \approx I_{A2}(R_{A2} + R_B) \frac{1 + j\omega C_1 (R_{A2} \| R_B)}{(1 + j\omega C_1 R_{A2})(1 + j\omega C_{PA} R_B)} \quad \text{(Eq. 5)}$$

If the magnitude of the boost current source (provided by $I_{A1}$) is made equal to the magnitude of the attenuation of the mid-band response of the steady state current source (provided by $I_{A2}$), the summation of the two responses is simplified. The condition for this is given by:

$$I_{A1} R_{A1} = I_{A2} R_B \quad \text{(Eq. 6)}$$

When this condition is satisfied, the summation of Eq. 4 and Eq. 5 becomes:

$$V_H \approx I_{A2}(R_{A2} + R_B) \frac{1}{1 + j\omega C_{PA} R_B} \quad \text{(Eq. 7)}$$

The frequency response is therefore that of a low pass filter whose cutoff frequency is equal to:

$$f_{3dB} = \frac{1}{2\pi C_{PA} R_B} \quad \text{(Eq. 8)}$$

which improves the frequency response of the system by the ratio of $R_B$ to $(R_{A2}+R_B)$.

Figure 5:
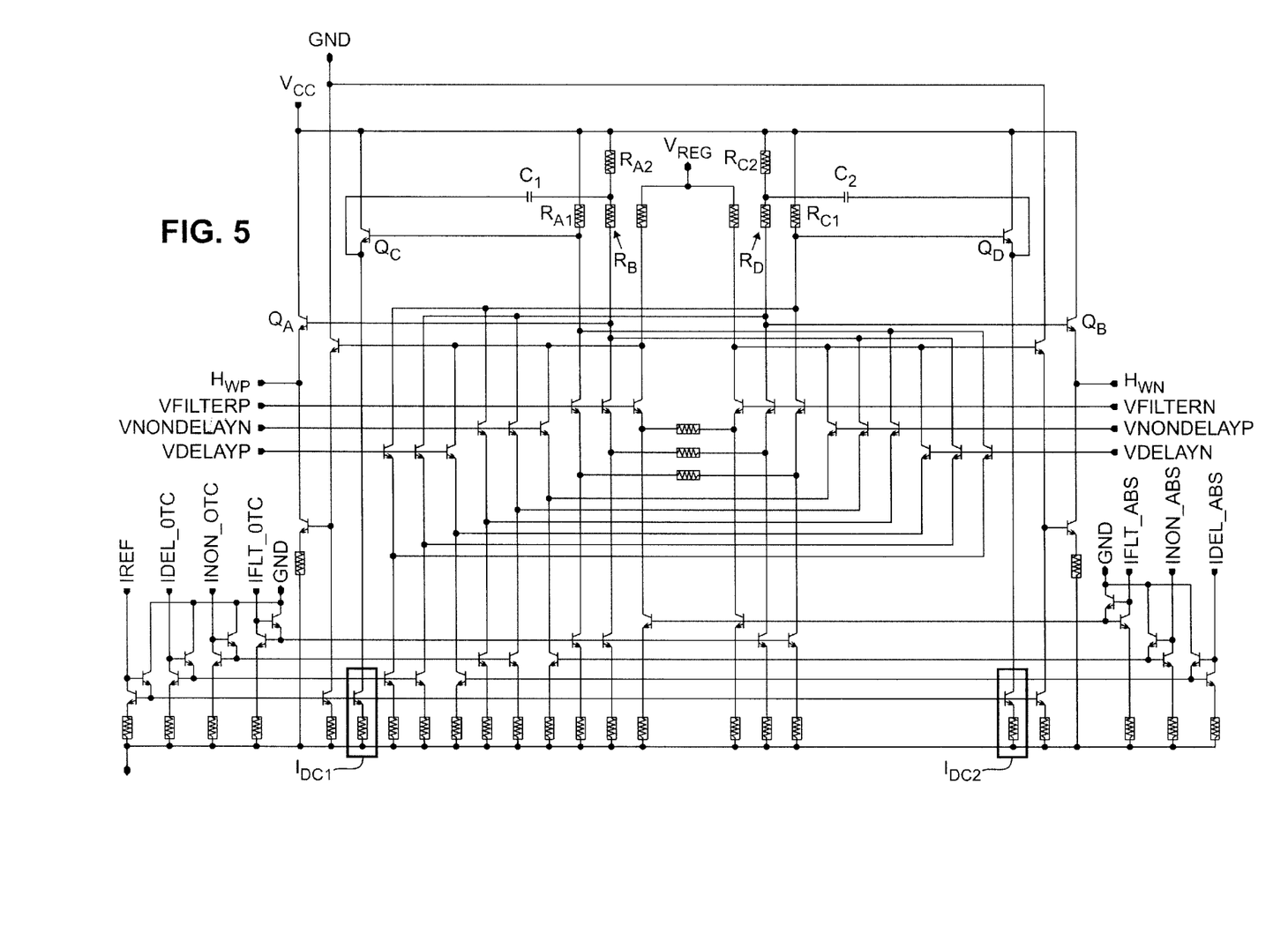
FIG. 5 is a diagram of an exemplary full circuit implementation of a write circuit employing capacitive boost according to the present invention.

FIG. 5 is a schematic diagram of an exemplary full circuit implementation of a write circuit employing capacitive boost according to the present invention. It should be understood that the circuit shown in FIG. 5 is shown to illustrate the best mode of practicing the invention, and should not be considered to limit the scope of the invention in any way. The portions of the circuit which functionally represent the capacitive boost components shown in FIG. 3 are labeled in order to simplify the understanding of the circuit. One skilled in the art will readily discern the operating characteristics of the overall circuit, in conjunction with the specification and drawings of the instant application and of U.S. application Ser. No. 10/219,940 (Docket No. V44.12-0152) filed on even date herewith for "Disk Drive Writer With Active Reflection Cancellation," by J. Leighton, C. Elliott, M. O'Brien, C. Rabe, N. Krenz, R. Wimmer and S. O'Brien, which is assigned to the same assignee as the instant application, and is hereby incorporated by reference.

Although the present invention has been described with reference to preferred embodiments, workers skilled in the art will recognize that changes may be made in form and detail without departing from the spirit and scope of the invention. Particularly, while some forms of the invention are described in the form of discrete devices, it is recognized that the circuit is preferably reduced to practice in the form of an integrated circuit (IC). Therefore, terms such as "device" and the like should be construed in their broadest contexts to include portions of ICs that are conveniently described as functional components, as well as discrete devices. Likewise, some forms of the invention are described in terms of logical gates and chips that could also be implemented by discrete devices, all within the scope and spirit of the present invention.

What is claimed is:

1. A write driver circuit for selectively providing write current through a write head in first and second opposite directions, comprising:
   first and second pre-drive signal-providing sources;
   first and second active devices coupled respectively to the first and second pre-drive signal-providing sources;
   first and second pull-up resistors coupled respectively between the first and second active devices and a fixed voltage;
   first and second capacitors coupled respectively to the first and second active devices;
   third and fourth pre-drive signal-providing sources;
   third and fourth active devices coupled respectively to the third and fourth pre-drive signal-providing sources, the write head being connected between the third and fourth active devices;
   a third pull-up resistance, comprising first and second resistance components, coupled between the third active device and the fixed voltage, the first capacitor being connected between the first and second resistance components;
   a fourth pull-up resistance, comprising third and fourth resistance components, coupled between the fourth active device and the fixed voltage, the second capacitor being connected between the third and fourth resistance components; and
   lower current-carrying circuitry for pulling current from the third and fourth active devices through the write head.

2. The write driver circuit of claim 1, wherein the pre-drive signals provided by the first and second pre-drive signal-providing sources have a first high frequency portion and a first low frequency portion, and the pre-drive signals provided by the third and fourth pre-drive signal-providing sources have a second high frequency portion and a second low frequency portion, the first high frequency portion being larger than the second high frequency portion and the first low frequency portion being smaller than the second low frequency portion.

3. The write driver circuit of claim 1, wherein the lower current-carrying circuitry comprises a pair of current mirrors connected to opposite sides of the write head.

4. The write driver circuit of claim 1, wherein the first pull-up resistor has a value equal to a value of the first resistance component of the third pull-up resistance, and the second pull-up resistor has a value equal to a value of the third resistance component of the fourth pull-up resistance.

5. The write driver circuit of claim 1, wherein the first and second pull-up resistors, the first resistance component of the third pull-up resistance and the third resistance component of the fourth pull-up resistance all have equal values.

6. The write driver circuit of claim 5, wherein the first and second pull-up resistors each have a value equal to about 75% of a value of a conventional pull-up resistor, the first resistance component of the third pull-up resistance and the third resistance component of the fourth pull-up resistance each have a value equal to about 75% of the value of a conventional pull-up resistor, and the second resistance component of the third pull-up resistance and the fourth resistance component of the fourth pull-up resistance each have a value equal to about 25% of the value of a conventional pull-up resistor.

7. The write driver circuit of claim 1, wherein devices of the circuit are realized as an integrated circuit (IC).

8. A method of selectively providing a write current through a write head in first and second opposite directions, comprising:
   driving first and second active devices with first and second pre-drive signals having a first high frequency portion and a first low frequency portion;
   driving third and fourth active devices with third and fourth pre-drive signals having a second high frequency portion smaller than the first high frequency portion and a second lower frequency portion larger than the first low frequency portion, the write head being connected between the third and fourth active devices;
   providing first and second pull-up resistances respectively between the first and second active devices and a fixed voltage;
   providing third and fourth pull-up resistances respectively between the third and fourth active devices and the fixed voltage;
   connecting a first capacitor between the first active device and an intermediate point of the third pull-up resistance; and
   connecting a second capacitor between the second active device and an intermediate point of the fourth pull-up resistance.

9. The method of claim 8, wherein providing third and fourth pull-up resistances between the third and fourth active devices and the fixed voltage, connecting a first capacitor between the first active device and an intermediate point of the third pull-up resistance, and connecting a second capacitor between the second active device and an intermediate point of the fourth pull-up resistance, comprises:

connecting a first resistance component between the third active device and the first capacitor;

connecting a second resistance component between the first capacitor and the fixed voltage;

connecting a third resistance component between the fourth active device and the second capacitor; and connecting a fourth resistance component between the second capacitor and the fixed voltage.

* * * * *